United States Patent
Wu et al.

(10) Patent No.: US 9,763,226 B2
(45) Date of Patent: Sep. 12, 2017

(54) SECONDARY CELL PREPARATION FOR INTER-SITE CARRIER AGGREGATION

(75) Inventors: Chunli Wu, Beijing (CN); Claudio Rosa, Randers (DK); Henri Markus Koskinen, Espoo (FI); Woonhee Hwang, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 339 days.

(21) Appl. No.: 14/371,594

(22) PCT Filed: Jan. 11, 2012

(86) PCT No.: PCT/EP2012/050348
§ 371 (c)(1),
(2), (4) Date: Sep. 21, 2015

(87) PCT Pub. No.: WO2013/104416
PCT Pub. Date: Jul. 18, 2013

(65) Prior Publication Data
US 2016/0050652 A1 Feb. 18, 2016

(51) Int. Cl.
*H04W 4/00* (2009.01)
*H04W 72/04* (2009.01)
(Continued)

(52) U.S. Cl.
CPC ......... *H04W 72/0406* (2013.01); *H04L 5/001* (2013.01); *H04L 5/0035* (2013.01);
(Continued)

(58) Field of Classification Search
CPC ................................. H04W 4/00; H04W 74/00
(Continued)

(56) References Cited

U.S. PATENT DOCUMENTS 8,194,603 B2 * 6/2012 Nimbalker .............. H04L 5/001
370/329
8,917,659 B2 * 12/2014 Lee ....................... H04W 48/12
370/328
(Continued)

FOREIGN PATENT DOCUMENTS

CN 101925155 A 12/2010
CN 102006655 A 4/2011
(Continued)

OTHER PUBLICATIONS

3GPP TS 36.331 V10.4.0 (Dec. 2011) "3rd Generation Partnership Project; Technical Specification Group Radio Access Network; Evolved Universal Terrestrial Radio Access (E-UTRA); Radio Resource Control (RRC); Protocol specification (Release 10)"; pp. 1-296; 3rd Generation Partnership Project (3GPP); Mobile Competence Centre; 650, Route des Lucioles; F-06921 Sophia-Antipolis Cedex; France.
(Continued)

*Primary Examiner* — Iqbal Zaidi
(74) *Attorney, Agent, or Firm* — Harrington & Smith

(57) ABSTRACT

According to embodiments of the invention, an apparatus is provided which includes a connection unit configured to send and/or receive data to and/or from a secondary network control node, a processor configured to establish a configuration preparation message for the secondary network control node for preparing a carrier aggregation in which data to a user equipment is transmitted by at least two component carriers, and in which at least one first component carrier is provided between the apparatus and the user equipment and at least one second component carrier is provided between the secondary network control node and the user equipment, wherein the configuration preparation message includes configuration preparation information for the carrier aggre-
(Continued)

gation, and the connection unit is configured to send the configuration preparation message to the secondary network control node.

16 Claims, 2 Drawing Sheets

(51) Int. Cl.
*H04L 5/00* (2006.01)
*H04W 28/24* (2009.01)
*H04W 28/06* (2009.01)

(52) U.S. Cl.
CPC .......... *H04L 5/0053* (2013.01); *H04W 28/24* (2013.01); *H04W 72/0453* (2013.01); *H04W 28/06* (2013.01)

(58) Field of Classification Search
USPC .......................... 370/328–339, 538, 431–457
See application file for complete search history.

(56) References Cited

U.S. PATENT DOCUMENTS

| | | |
|---|---|---|
| 9,131,516 B2* | 9/2015 | Ye .................... H04W 74/04 |
| 9,525,526 B2* | 12/2016 | Rosa ................ H04W 72/1284 |
| 2012/0082125 A1 | 4/2012 | Huang ........................ 370/329 |
| 2013/0136025 A1 | 5/2013 | Li et al. ....................... 370/252 |

FOREIGN PATENT DOCUMENTS

| | | |
|---|---|---|
| WO | WO 2010/105145 A1 | 9/2010 |
| WO | WO 2011/063244 A2 | 5/2011 |
| WO | WO 2011/100673 A1 | 8/2011 |
| WO | WO-2011/150774 A1 | 12/2011 |
| WO | WO 2012/136256 A1 | 10/2012 |

OTHER PUBLICATIONS

3GPP TSG RAN WG1 Meeting #56bis, Seoul, Korea, Mar. 23-27, 2009, R1-091134, "CoMP configuration for multiple component carriers in LTE-A", Sharp, 2 pgs.

* cited by examiner

SECONDARY CELL PREPARATION FOR INTER-SITE CARRIER AGGREGATION

FIELD OF THE INVENTION

The present invention relates to apparatuses, methods and a computer program product for achieving a functional split for a multi-node carrier aggregation transmission scheme.

RELATED BACKGROUND ART

The following meanings for the abbreviations used in this specification apply:
AMBR Aggregate Maximum Bit Rate
AMC Adaptive modulation & coding
ARP Allocation and Retention Priority
BSR Buffer Status Report
CA Carrier aggregation
CC Component carrier
CoMP Coordinated Multi Point
CRC Cyclic Redundancy Check
DL Downlink
DRB Data Radio Bearer
DRX Discontinuous Reception.
eNB enhanced Node-B
E-UTRA Evolved Universal Terrestrial Radio Access.
GBR Guaranteed Bit Rate
GPRS General Packet Radio Service.
GTP GPRS Tunneling Protocol.
HARQ Hybrid automatic repeat request
HO Handover
HSPA High-Speed Packet Access
ID Identity
I-HSPA Internet High-Speed Packet Access
LCID Logical Channel ID.
LTE Long term evolution
LTE-A LTE-Advanced
MAC Media Access Control
PCell Primary Cell
PDCCH Physical Downlink Control Channel
PDCP Packet Data Convergence Protocol
PDSCH Physical Downlink Shared Channel
PDU Packet Data Unit
PHY Physical Layer
PRACH Physical Random Access Channel
PUCCH Physical Uplink Control Channel
PUSCH Physical Uplink Shared Channel
QCI Quality of Service (QoS) Class Identifier
QoS Quality of Service
RA Random Access
RLC Radio Link Control
RRC Radio Resource Control
SCell Secondary Cell
TA Time Alignment
TDM Time Division Multiplexing
TEID Tunneling End Identity
UE User equipment
UL Uplink Embodiments of the present invention relate to a heterogeneous network scenario in which different types of base station nodes are provided. As an example, a case with macro-cells and pico-cells is considered, although the small cells could be microcells or even Femtocells in future standardization releases as well. That is, a case is considered in which within the coverage area of a large cell other smaller cells are provided. Hence, the larger cell is also referred to as umbrella cell. For such cases, the macro-cells could be installed to operate on certain frequencies, while the pico-cells are using other frequencies. In this embodiments, eNB controlling macro-cell is called macro-eNB and eNB controlling pico-cell is called pico-eNB and an X2 interface is defined between the macro-eNB and the pico-eNB.

Such a situation is shown in FIG. 1. In this example, a macro-cell controlled by macro-eNB is using carrier F1, whereas pico-cells controlled by pico-eNB are using carrier F2.

In such a situation an X2-based inter-site LTE carrier aggregation (CA)/COMP can be applied. When configured with inter-site CA/CoMP, a UE is connected to multiple non-collocated eNBs via separate frequency carriers or same frequency. One eNB is controlling a primary cell (PCell) or primary component carrier, and possibly one or more secondary cells (SCell) or secondary component carrier, while the other eNB is controlling one or more SCells or secondary component carriers. Major modifications to the Release 10 specifications are needed to support this type of CA configuration.

An example is shown in FIG. 1, in which a UE is connected to a macro-eNB (a first eNB) and to a pico-eNB (a second eNB). The macro-eNB is using carrier F1 (PCell or primary component carrier), whereas the pico-eNB is using carrier F2 (SCell or secondary component carrier). Between the two eNBs, an X2 interface is provided.

Application PCT/EP2011/055409 introduces a general framework for an inter-site LTE CA as outlined above, and suggests that the configuration of a small cell as SCell is performed using RRC. For Rel-10, carrier aggregation is only supported for intra-eNB, hence the eNB knows all the parameters to be configured for the SCell.

However, when the cells to be aggregated are from different eNBs, coordination via X2 would be required to ensure e.g.:
C-RNTI allocated to the UE is not used by other UEs in the SCell (currently common C-RNTI is used for all the aggregated serving cells);
QoS requirements are met without wasting of resources.

It could be thought of using the inter-eNB HO preparation procedure as part of the purpose of inter-site SCell preparation, but the two procedures are quite different concerning the following aspects. For example, after C-RNTI allocation by the target cell, the C-RNTI is not used by the UE in the source cell anymore, in order to avoid collision problems in the HO case. Furthermore, the QoS parameters delivered via X2 for HO and QoS parameters for inter-site CA case will be different. In case of HO, the source eNB forwards the QoS parameters as received from MME to the target eNB. However, in case of inter-site CA, PCell eNB will calculate new QoS parameters which fits to pico-cell taking into account the X2 delay between macro and pico, scheduling capacity in the macro, etc.

Thus, application of the HO case for the SCell preparation would not be feasible.

Hence, presently there is no sufficient mechanism to surely applying a carrier aggregation with separate eNBs.

SUMMARY OF THE INVENTION

Embodiments of the present invention address this situation and aim to improve a procedure for preparing an SCell for inter-site CA.

According to exemplary embodiments of the present invention, this is accomplished by an apparatus and a method which establish a configuration preparation message for a secondary network control node for preparing a carrier aggregation in which data to a user equipment is transmitted by at least two component carriers, and in which at least one first component carrier is provided between the a primary network control node and the user equipment and at least one second component carrier is provided between the secondary network control node and the user equipment, wherein the configuration preparation message comprises configuration preparation information for the carrier aggregation.

According to exemplary embodiments of the present invention, an apparatus and a method are provided in which a configuration preparation message is received which includes configuration preparation information for preparing a carrier aggregation in which data to a user equipment is transmitted by at least two component carriers, and in which at least one first component carrier is provided between a primary network control node and the user equipment and at least one second component carrier is provided between a primary network control node and the user equipment, and wherein the at least one second component carrier is configured based on the received configuration preparation information.

According to exemplary embodiments of the present invention, an apparatus and a method are provided in which at least a first component carrier from and/or to a primary network control node, and at least a second component carrier from and/or to a secondary network control node are sent and/or received, configuration information is received from the primary network control node and/or the secondary control node, and a common temporary identifier or different temporary identifiers are used for the at least one first component carrier and the at least one second component carrier depending on the configuration information.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1:
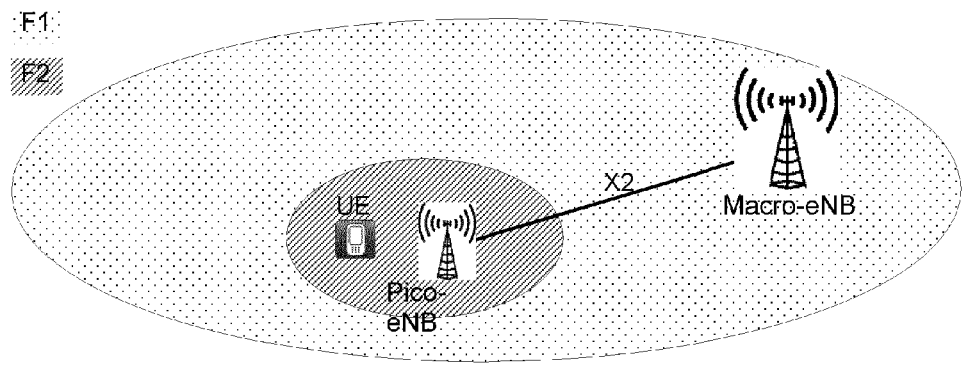
FIG. 1 shows an example for heterogeneous network scenario in which a macro-eNB and a pico-eNB are provided within the coverage area of the macro-eNB.

As described above, according to embodiments of the present invention an architectural functional-split for LTE is provided that facilitates downlink data transmission via both macro and pico-eNBs to the same UE, as indicated in FIG. 1. In certain embodiments, it is built on the already defined LTE carrier aggregation (CA) functionality that is defined in Rel-10. Although the solution is outlined for the LTE case, similar measures are applicable also for HSPA with multi-carrier capabilities, more specifically with I-HSPA microcell NB.

Nevertheless, according to several embodiments, it is aimed to rely as much as possible on the LTE Rel-10 standardized framework for CA, so that only minimum changes and updates are required to have such scenarios supported in coming LTE releases.

In particular, Rel-10 of the E-UTRA specifications introduces carrier aggregation (CA), where two or more component carriers (CCs) are aggregated in order to support wider transmission bandwidths up to 100 MHz. In CA it is possible to configure a UE to aggregate a different number of CCs originating from the same eNB and of possibly different bandwidths in the uplink (UL) and downlink (DL).

In the following, a general embodiment for a macro-eNB, a pico-eNB and a user equipment is described by referring to FIG. 2.

The macro-eNB 21 comprises a connection unit 211 which is configured to send and/or receive data to and/or from a secondary network control node (e.g., the pico-eNB 22). Furthermore, the macro-eNB 21 comprises a processor 212 which is configured to establish a configuration preparation message for the secondary network control node for preparing a carrier aggregation in which data to a user equipment (e.g., the UE 23) is transmitted by at least two component carriers, and in which at least one first component carrier is provided between the apparatus and the user equipment and at least one second component carrier is provided between the secondary network control node and the user equipment. The configuration preparation message comprises configuration preparation information for the carrier aggregation, and the connection unit is configured to send the configuration preparation message to the secondary network control node.

The pico-eNB 22 comprises a connection unit 221 configured to send and/or receive data to and/or from a primary network control node (e.g., the macro-eNB 21), and a processor 222. The connection unit 222 is configured to receive a configuration preparation message including configuration preparation information for preparing a carrier aggregation in which data to a user equipment is transmitted by at least two component carriers, and in which at least one first component carrier is provided between the primary network control node and the user equipment and at least one second component carrier is provided between the apparatus and the user equipment. The processor 222 is configured to configure the at least one second component carrier based on the received configuration preparation information.

The user equipment (UE) 23 comprises a transceiver unit 231 configured to receive and/or to send data on at least one first component carrier from and/or to a primary network control node (e.g., the macro-eNB 21), and on a at least a second component carrier from and/or to a secondary network control node (e.g., the pico-eNB 22).

Thus, the necessary configuration preparation information is exchanged between the network control nodes within a configuration preparation message. Hence, the secondary network control node can easily obtain the necessary information for preparing the second component carrier (i.e., an SCell). Thus configuration preparation message can also be termed as an SCell configuration preparation message.

This configuration preparation message may be sent via a general interface defined between network control nodes, for example via the X2 interface.

The configuration preparation information in the configuration preparation message may comprise configuration parameters for the component carriers, for example common configuration parameters.

It is noted that the macro-eNB is only an example for an apparatus which sends the configuration preparation message, and the pico-eNB is only an example for an apparatus which receives the configuration preparation message. Both eNBs can be replaced by any suitable network element or parts thereof.

According to certain embodiments, the carrier aggregation mentioned above may be carried out as follows.

For example, the eNB 21 (or a corresponding apparatus 21) may comprise a network interface (not shown) configured to receive and/or send data for the user equipment 23 from and/or to a network. The processor 212 may then be configured to control a split of the data for sending and/or receiving over the at least two component carriers.

The eNB 21 may further comprise a transceiver unit 214 configured to perform a downlink and/or uplink transmission with the user equipment (e.g., UE 23) via the at least first one of the at least two component carriers. The processor 212 may be further configured to send and/or to receive the data of at least a second one of the at least two component carriers to and/or from the secondary network control node (e.g., the pico-eNB 22).

That is, for example in the downlink case, the network interface receives a data stream from the network (core network or the like) intended for the UE 23. The processor 212 splits the data stream such that data for at least two component carriers can be generated. At least one of the component carriers is generated by the transceiver unit 214 and sent to the UE 23. Data for the at least second component carrier is sent from the processor 212 (via the connection unit 221) to the pico-eNB 22.

In the uplink case, the transceiver unit 214 receives data via at least a first component carrier from the UE 23. The processor 212 also receives data of at least a second component carrier from the secondary network control node (e.g., the pico-eNB 22). The processor 212 combines the data of the at least first component carrier and the at least second component carrier, and the network interface forwards the data to the network.

In the secondary network control node (e.g., the pico-eNB 22) the procedure may be as follows: For example in the downlink case, the processor 222 of the pico-eNB 22 receives data for at least one component carrier for the user equipment 23 (via the connection unit 221), and the transceiver unit 223 sends the data via the component carrier to the user equipment. In the uplink case, the transceiver unit 223 receives data via at least one component carrier, and the processor 222 forwards the received data to the macro-eNB 21.

For the UE, the procedure is as follows: in the downlink case, the transceiver unit 231 may receive data on at least a first component carrier from the macro-eNB 21, and data on at least a second component carrier from the pico-eNB 22. In the uplink case, the processor 232 splits the data to be transmitted for at least two component carriers, and the transceiver unit 231 may send data on at least a first component carrier to the master network node 21, and data on at least a second component carrier to the slave network node 22.

In addition to the elements described above, the apparatuses may comprise memories 213, 221 and 233 for storing data and programs, by means of which the processors 212, 222 and 232 may carry out their corresponding functions.

The configuration preparation information in the configuration preparation message may comprises a temporary identifier for the user equipment to be used by the at least one second component carrier. Such a temporary identifier may be a C-RNTI, for example.

Moreover, a common temporary identifier for the user equipment to be used by the at least first component carrier and by the at least one second component carrier (e.g., PCell and SCell) may be defined, or alternatively a common temporary identifier may be negotiated between the primary and secondary network control nodes.

Figure 2:
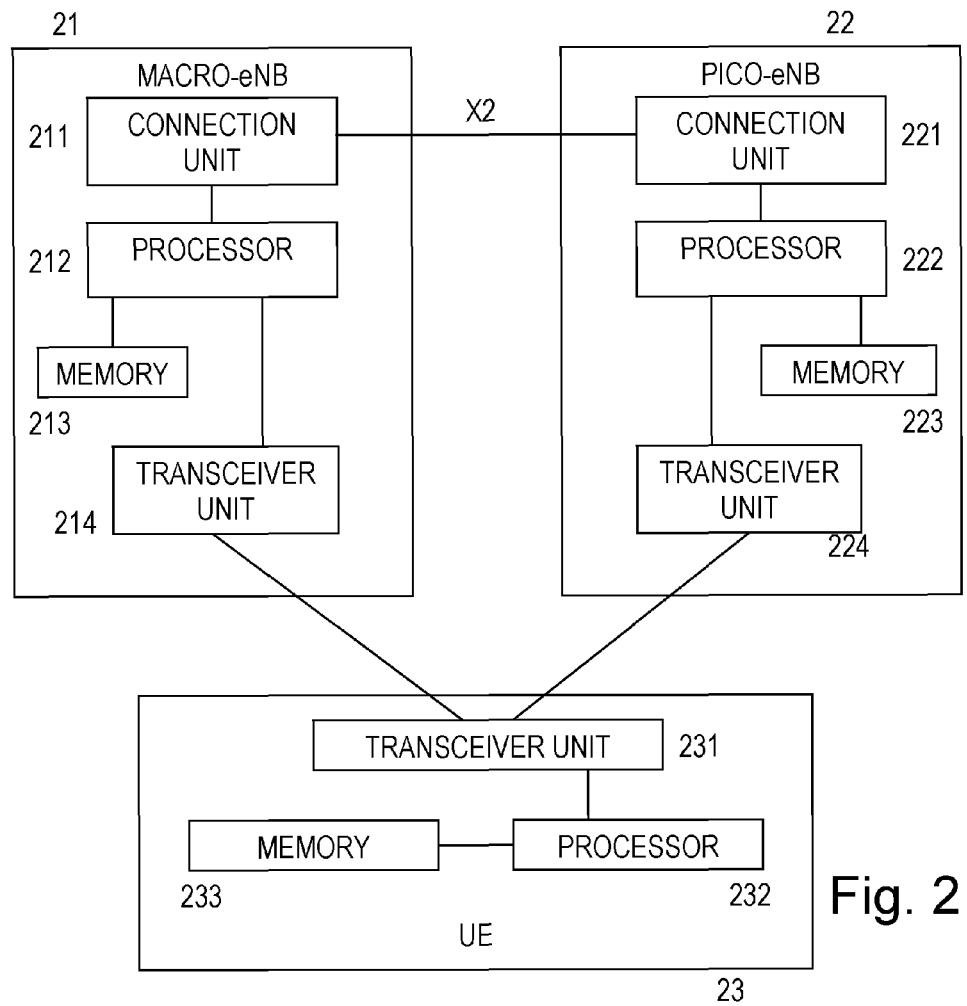
FIG. 2 shows a macro-eNB, a pico-eNB and an UE according to an embodiment of the present invention.

With respect to the temporary identifier, the processor 232 of the UE 23 shown in FIG. 2 may be configured to receive configuration information from the primary network control node and/or the secondary control node, and to use a common temporary identifier or different temporary identifiers for the at least one first component carrier and the at least one second component carrier depending on the configuration information.

Figure 3:
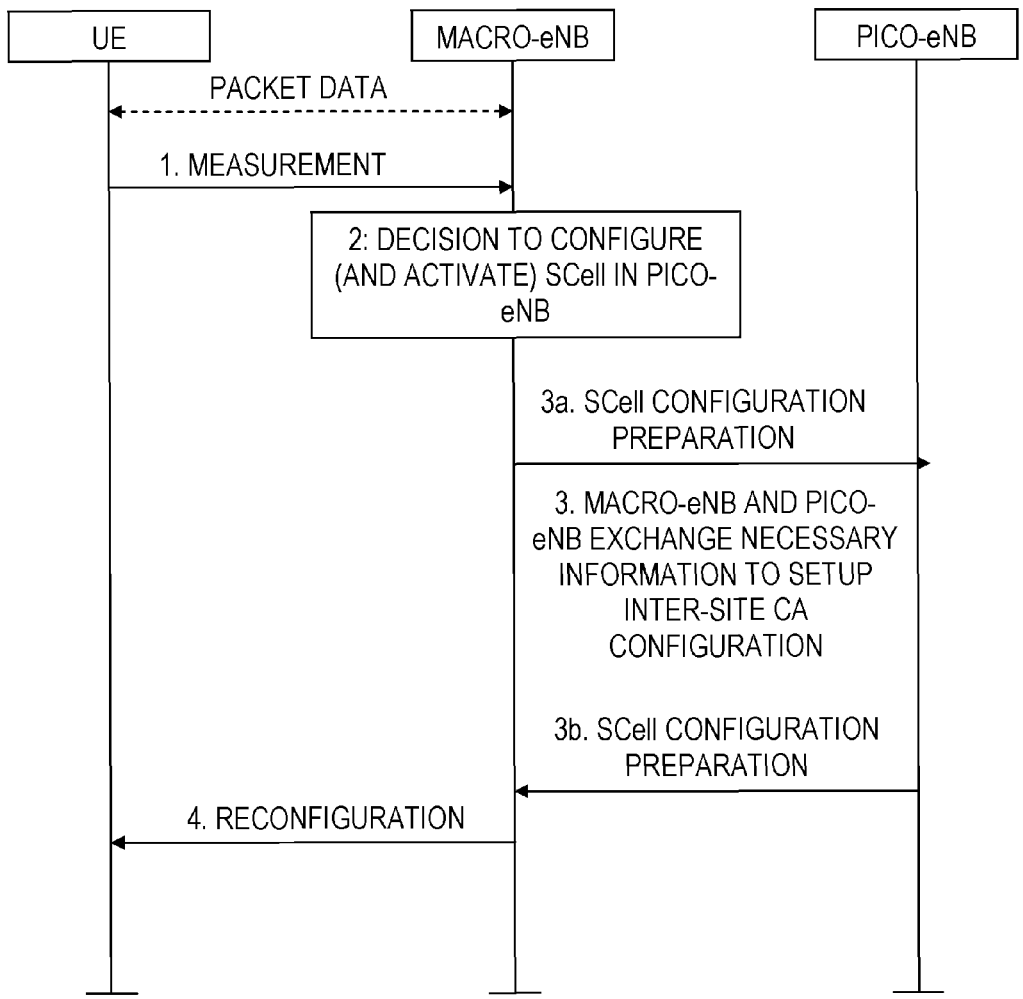
FIG. 3 shows a procedure for SCell preparation with an X2-based inter-site LTE CA according to an embodiment of the present invention.

The configuration information including the temporary identifier may be received in an RRC message, for example, and may be included in SCell configuration information in such an RCC message. An example for such a message is an RCC reconfiguration message to the UE as shown in FIG. 3.

Hence, as described above, embodiments of the present invention introduce a novel procedure for inter-site SCell preparation.

According to a more specific embodiment, the following information (also referred to as configuration parameters) is communicated between eNBs via X2 interface during the SCell preparation stage:

The macro-eNB sends a X2 message to configure the SCell to the pico-eNB. The parameters include e.g. common parameters for all the serving cells.

The common parameters may include, for example: RLC configuration parameters, MAC configuration parameters etc. if they are common for all serving cells.

The pico-eNB responds to a successful SCell configuration preparation with necessary parameters which the pico-eNB has to provide. These parameters are referred to as configuration response parameters.

For example, the configuration response parameters may include cell specific physicalConfigDedicated parameters and RadioResourceConfigCommonSCell-r10 which are to be sent to the UE when the macro-eNB configures the UE with the SCell. It is noted that these parameters are defined in TS 36.331, for example.

For the cell specific parameters that are broadcasted in the pico-eNB, e.g. RadioResourceConfigCommonSCell-r10, it is possible to send them to the macro-eNB beforehand and update them only when changed as it is common for all the UEs, thus these parameters can be provided by pico-eNB to macro independent of individual SCell configuration procedure.

For some parameters related to scheduling, it is possible to have cell specific values, e.g. T-reordering in RLC configuration (especially if the macro-eNB and the pico-eNB have independent RLC) and maximum number of HARQ retransmissions, DRX configurations in MAC configuration. These parameters should be sent from the pico-eNB to the macro-eNB, or negotiated between the pico-eNB to the macro-eNB, and then configured to the UE. If the flow control at the pico-eNB is based on maintaining a target buffer size in terms of queuing delay, the macro-eNB also needs to be aware of this, although the UE does not. The macroeNB will use this information either in scheduling downlink packets to the pico-eNB, or in the setting of T-reordering.

If C-RNTI should be the same in the SCell as used in the PCell, the macro-eNB notifies the pico-eNB over the X2 interface about the C-RNTI for the UE. If the C-RNTI for SCell is allocated by the pico-eNB, it is sent from the pico-eNB to the macro-eNB.

For the latter case (i.e., when using different C-RNTIs for the PCell and the SCell), the macro-eNB will include the C-RNTI for the SCell when configuring the SCell in a RRC message. Thus, from UE point of view, different C-RNTIs are used for different serving cells, other than having same C-RNTI for all the serving cells as in Rel-10.

Furthermore, one or more GTP tunnel endpoints for U-plane transfer over X2 for UL and DL are communicated between the eNBs over the X2 interface. The bearer of each packet transferred across X2 needs to be identified either by the GTP tunnel, or MAC header (and its Logical-Channel ID).

Moreover, QoS parameters i.e. QoS Class Identifier and possible Guaranteed Bit Rate (GBR) are communicated between the macro-eNB and the pico-eNB over the X2 interface to ensure QoS requirement is met with independent schedulers, e.g. the macro-eNB requests the pico-eNB to serve certain percentage of GBR bearers and/or certain percentage of the Aggregate Maximum BitRate (AMBR) part of the UE's subscription.

It may be useful to enable the pico-eNB to practice admission control with bearer-granularity, i.e. to allow the pico-eNB to reject some bearers offered by the macro-eNB, e.g. because of its present load conditions. For this purpose, also Allocation and Retention Priority (ARP) per bearer may be useful knowledge to the pico-eNB. Hence, the above configuration parameters may also include ARP per bearer.

In the following, a more detailed implementation according to an embodiment of the present invention is described by referring to FIG. 3.

FIG. 3 illustrates the situation that the macro-eNB (e.g., macro-eNB 21 shown in FIG. 2) controls the PCell, and the pico-eNB (e.g., pico-eNB 22 shown in FIG. 2) controls the SCell that is to be configured to the UE (e.g., UE 23 shown in FIG. 3). A dotted arrow between the UE and the macro-eNB indicates an ongoing packet data transmission containing user data therebetween.

After the macro-eNB receives a measurement report from the UE (step 1) and decides to configure a cell controlled by pico-eNB as an SCell for the UE (step 2), the macro-eNB will send an X2 message, namely a SCell configuration preparation message (as an example for the above-described configuration preparation message) to configure SCell under Pico-eNB (step 3a). In this message, the macro-eNB will include necessary parameters (e.g., the above-described configuration parameters) which the pico-eNB should know, e.g., QoS parameters which are expected from Pico SCell scheduler, RLC configuration, MAC configuration, GTP tunnel endpoint(s) for UL, etc. And after configuring SCell, Pico-eNB responds with another X2 message, namely a configuration response message (step 3b) which may include some QoS parameters for negotiation, C-RNTI allocated by Pico, SCell specific parameters to Macro-eNB, GTP tunnel endpoint(s) for DL (e.g., the above-described configuration response parameters). (step 3 consisting of step 3a and step 3b).

C-RNTI for SCell and other parameters from SCell will be included in the RRC reconfiguration message (as an example for a configuration message) to the UE at step 4.

In another possible implementation, the macro-eNB signals to the pico the C-RNTI being used on PCell (and other SCells controlled by the macro-eNB) during step 3a. The C-RNTI is used for the newly configured SCell if not already used by other UEs/cells controlled by the pico-eNB. Otherwise, i.e., in case this C-RNTI is already used by other UEs/cells, the pico-eNB allocates a new C-RNTI and sends it to the macro-eNB via X2 (step 3b), as described above.

In the following, parameters which may be sent from the macro-eNB (also referred to as PCell eNB) to the pico-eNB (also referred to as SCell eNB) as configuration parameters in the configuration preparation message are listed:
 C-RNTI (if same C-RNTI to be used for all the serving cells);
 DRB configuration:
  Logical Channel ID (logicalChannelIdentity);
  Logical Channel Configuration (LogicalChannelConfig which include the UL PRB/MBRs for UL scheduler);
 MAC configuration:
  Maximum HARQ retx number (maxHARQ-Tx): if it is common for all the serving cells as it is for Rel-10;
  DRX configuration (drx-Config): if it is common for all the serving cells as it is for Rel-10;
  SCell deactivation timer (sCellDeactivationTimer-r10): if the macro-eNB decides the parameter;
  extendedBSR-Sizes: for the pico-eNB to recognize the BSR format as same LCID is used for normal BSR and extended BSR
 PHY configuration:
  UL subframes division between PCell (macro-eNB) and SCell (pico-eNB) if TDM is to be applied for single UL carrier solution.

For each GTP tunnel to be established between the macro-eNB and the pico-eNB for uplink:
 Transport Layer Address, GTP TEID Like currently done with Handover Request from a source cell to a potential target cell, it may be useful for the macro-eNB to signal the following QoS parameters for the bearers to be handled by the pico-eNB, per bearer:
 QCI
 Allocation and Retention Priority (ARP)
 GBR QoS information In this case, ARP would serve purposes of admission control by the pico-eNB.

In addition, it might be useful for the macro-eNB to signal AMBR of the UE's subscription, as well as for GBRs and AMBR, the percentage shares (if not 100%) that the pico-eNB is expected to schedule.

In the following, parameters (configuration response parameters) to be sent from the pico-eNB to the macro-eNB (for example, for the macro-eNB to signal to the UE) are listed:
 RadioResourceConfigCommonSCell-r10 (as defined in TS 36.331) can possibly be sent to the macro-eNB beforehand and updated only when changed, or included upon SCell setup for the UE (at step 3b).
 PhysicalConfigDedicatedSCell-r10 (as defined in TS 36.331) should be sent from the pico-eNB to the macro-eNB upon SCell setup for the UE.

Other parameters which may be sent from the pico-eNB to the macro-eNB:
 C-RNTI: if different C-RNTIs for different serving cells are applied
 RLC configuration for independent RLC structure:

rlc-Config: which include RLC parameters e.g. T-reordering timer, etc.

MAC configuration:
Maximum HARQ retx number (maxHARQ-Tx): if it is cell specific;
DRX configuration (drx-Config): if it cell specific;
SCell deactivation timer (sCell DeactivationTimer-r10): if the pico-eNB decides the parameter for the SCell;
Time Alignment Timer (TimeAlignmentTimer): if the pico-eNB (SCell) and the macro-eNB (PCell) belong to different TA groups.

PHY configuration:
PUCCH Format (pucch-Format-r10): if PUCCH is also configured on SCells for UCI transmission towards pico, which include e.g. PUCCH format 3 configurations.
PRACH/RACH configuration: if PCell and SCell belong to different TA groups and RA (Random Access) on SCell is to be performed, including e.g.:
PRACH-Config;
Power ramping parameters (powerRampingParameters);
Maximum preamble retx number (preambleTransMax);
RA window (ra-ResponseWndowSize)

For each GTP tunnel to be established between the macro-eNB and the pico-eNB for downlink:
Transport layer address
GTP TEID Thus, according to certain embodiments of the present invention, the following advantages can be achieved:

The necessary parameters are exchanged between the macro-eNB and the pico-eNB to ensure that the macro-eNB obtains the pico-eNB specific parameters to configure the UE, and the pico-eNB obtains necessary parameters to communicate with the UE.

It is introduced the possibility to have cell specific parameters for those related to scheduling, e.g. maximum number of HARQ retransmissions, T-reordering, target buffer size in terms of queuing delay, to have higher efficiency when the channel qualities are different among cells and to allow more flexible independent schedulers.

If keeping the Rel-10 behaviour of using common C-RNTI for all the serving cells for the UE (in the following referred to as UE A), the macro-eNB will allocate the C-RNTI and tell the pico-eNB. The C-RNTI allocated by the macro-eNB might already have been allocated to another UE (in the following referred to as UE B) connected to the pico-eNB, then the pico-eNB will need to reallocate another C-RNTI for UE B. (Same issue if the pico-eNB allocates C-RNTI and the macro-eNB has to do the co-ordination of the UEs under the macro-eNB.) In practise, it is very difficult to change C-RNTI for a UE on the fly because it is used in physical layer to e.g. derive the UE specific search space, for PDCCH blind decoding (CRC scrambled by C-RNTI), for PDSCH/PUCCH/PUSCH scrambling etc. Thus most likely it needs to do intra-cell HO for UE B, which will introduce unnecessary interruption for UE B and SCell configuration delay for UE A.

Negotiation of the QoS parameters ensures QoS requirements are met and avoids waste of resources. Negotiation of the QoS parameters could consist in the macro-eNB requiring the Pico node to serve a certain percentage of the GBR or a certain percentage of the AMBR. Another possible implementation is all the data corresponding to a specific radio bearer is transmitted via the Pico node.

It is noted that the embodiments and the present invention in general are not limited to the specific examples given above.

For example, in the above embodiments a case was described in which one macro-eNB and one pico-eNB is applied. However, the number of participating eNBs is not limited. That is, also a plurality of pico-eNBs could be applied, that is, the carrier aggregation could be achieved by a PCell and a plurality of SCells. Moreover, in such a case each pico-eNB could control more than one SCell, and also the macro-eNB may control one or more SCell besides of the PCell.

In the above embodiments, a case was described that the eNB controlling the PCell (also referred to as master network node) is a macro-eNB, i.e., the base station which controls the larger cell as shown in FIG. 1. However, the invention is not limited to this, and it is possible that also a pico-eNB, i.e., a base station which controls the smaller cell, could control the PCell, whereas the macro-eNB controls the SCell. Whatever the case, the eNB controlling the PCell should be termed as master network control node, whereas the eNB controlling the SCell should be termed as slave network control node.

Furthermore, both network control nodes (base stations) could be equal. For example, two eNB could work together in an overlapping area of the cells, in which the UE is located. That is, one the eNBs would then be the macro-eNB as described above, and the other eNB would be the pico-eNB.

Moreover, the nodes described above as eNBs and/or macro and pico-eNBs are not limited to these specific examples and can be any kind network control node (e.g., a base station) which is capable for transmitting via component carriers to a user equipment.

Moreover, in the above embodiments the interface defined between the eNBs was described as an X2 interface. However, instead any suitable interface or connection between network control nodes (such as eNBs) can be applied, as long as it is possible to transmit a configuration preparation message and a response message over such an interface or connection.

According to a first aspect of general embodiments of the present invention, an apparatus is provided comprising a connection unit configured to send and/or receive data to and/or from a secondary network control node, and a processor configured to establish a configuration preparation message for the secondary network control node for preparing a carrier aggregation in which data to a user equipment is transmitted by at least two component carriers, and in which at least one first component carrier is provided between the apparatus and the user equipment and at least one second component carrier is provided between the secondary network control node and the user equipment, wherein the configuration preparation message comprises configuration preparation information for the carrier aggregation, and the connection unit is configured to send the configuration preparation message to the secondary network control node.

The first aspect may be modified as follows:

The connection unit may be configured to send the configuration preparation message via an interface defined between network control nodes. For example, the interface may be a X2 interface.

The configuration preparation information may comprise configuration parameters for the component carriers.

The configuration parameters may comprise common parameters for the component carriers, wherein the common parameters optionally may comprise radio link control configuration parameters and/or medium access control configuration control parameters.

The configuration preparation information may comprise tunnel information for configuring a tunnel between the apparatus and the secondary network control node, and/or the configuration preparation information comprises quality of service information. This tunnel may serve for transferring uplink data between the apparatus and the secondary network control node, for example.

The configuration preparation information may comprise a temporary identifier for the user equipment to be used by the at least one second component carrier.

The processor may be configured to define a common temporary identifier for the user equipment to be used by the at least first component carrier and by the at least one second component carrier, or to negotiate a common temporary identifier for the user equipment with the secondary network control node.

The connection unit may be configured to receive a configuration response message including configuration response information from the secondary network control node, and the processor may be configured to use the configuration response information for utilizing the at least one second component carrier and configuring it to the user equipment.

The configuration response information may include cell specific information.

The configuration response information may include a temporary identifier for the user equipment to be used by the at least one second component carrier, and/or the configuration response information includes tunnel information for configuring a tunnel between the apparatus and the secondary network control node. This tunnel may serve for transferring downlink data between the apparatus and the secondary network control node.

The apparatus according to the first aspect and its modifications may be a primary network control mode or a part thereof, for example.

According to a second aspect of general embodiments of the present invention, an apparatus is provided comprising
a connection unit configured to send and/or receive data to and/or from a primary network control node, and
a processor,
wherein the connection unit is configured to receive a configuration preparation message including configuration preparation information for preparing a carrier aggregation in which data to a user equipment is transmitted by at least two component carriers, and in which at least one first component carrier is provided between the primary network control node and the user equipment and at least one second component carrier is provided between the apparatus and the user equipment, and
the processor is configured to configure the at least one second component carrier based on the received configuration preparation information.

The second aspect may be modified as follows:
The connection unit may configured to receive the configuration preparation message via an interface defined between network control nodes. The interface may be a X2 interface, for example.

The processor may be configured to define a common temporary identifier for the user equipment to be used by the at least first component carrier and by the at least one second component carrier, or to negotiate a common temporary identifier for the user equipment with the primary network control node.

Moreover, the processor may be configured to establish a configuration response message including configuration response information, and the connection unit may be configured to send the configuration response message to the primary network control node.

Further modifications of the second aspect, in particular in respect to configuration preparation information and configuration response information, may be same or similar as according to the modifications of the first aspect.

The apparatus according to the second aspect and its modifications may be a secondary network control mode or a part thereof, for example.

According to a third aspect of general embodiments of the present invention, an apparatus is provided comprising
a transceiver unit configured to receive and/or to send at least a first component carrier from and/or to a primary network control node, and at least a second component carrier from and/or to a secondary network control node,
a processor configured to receive configuration information from the primary network control node and/or the secondary control node, and
to use a common temporary identifier or different temporary identifiers for the at least one first component carrier and the at least one second component carrier depending on the configuration information.

Optionally, the transceiver unit may be configured to receive configuration information for configuring the at least one first component carrier and the at least one second component carrier from the primary network control node or the secondary control node.

The apparatus according to the third aspect may be a user equipment or a part thereof, for example.

According to a fourth aspect of general embodiments of the present invention, a method is provided comprising
establishing a configuration preparation message for a secondary network control node for preparing a carrier aggregation in which data to a user equipment is transmitted by at least two component carriers, and in which at least one first component carrier is provided between a primary network control node and the user equipment and at least one second component carrier is provided between the secondary network control node and the user equipment, wherein the configuration preparation message comprises configuration preparation information for the carrier aggregation, and
sending the configuration preparation message to the secondary network control node.

The fourth aspect may be modified as follows:
The method may further comprise sending the configuration preparation message via an interface defined between network control nodes. For example, this interface may be a X2 interface.

The configuration parameters may comprise common parameters for the component carriers, wherein the common parameters optionally may comprise radio link control configuration parameters and/or medium access control configuration control parameters.

The configuration preparation information may comprise tunnel information for configuring a tunnel between the primary network control node and the secondary network control node, and/or the configuration preparation information may comprise quality of service information.

The configuration preparation information may comprise a temporary identifier for the user equipment to be used by the at least one second component carrier.

The method may further comprise
defining a common temporary identifier for the user equipment to be used by the at least first component carrier and by the at least one second component carrier, or
negotiating a common temporary identifier for the user equipment with the secondary network control node.

The method may further comprise
receiving a configuration response message including configuration response information from the secondary network control node, and
using the configuration response information for utilizing the at least one second component carrier and configuring it to the user equipment.

The configuration response information may include cell specific information.

The configuration response information may include a temporary identifier for the user equipment to be used by the at least one second component carrier, and/or the configuration response information includes tunnel information for configuring a tunnel between the secondary network control node and the primary network control node.

The method according to the fourth aspect and its modifications may be carried out by the primary control node or a part thereof, for example.

According to a fifth aspect of general embodiments of the present invention, a method is provided comprising
receiving a configuration preparation message including configuration preparation information for preparing a carrier aggregation in which data to a user equipment is transmitted by at least two component carriers, and in which at least one first component carrier is provided between a primary network control node and the user equipment and at least one second component carrier is provided between a primary network control node and the user equipment, and
configuring the at least one second component carrier based on the received configuration preparation information.

The fifth aspect may be modified as follows:

The method may further comprise receiving the configuration preparation message via an interface defined between network control nodes. This interface may be a X2 interface.

The method may further comprise
defining a common temporary identifier for the user equipment to be used by the at least first component carrier and by the at least one second component carrier, or
negotiating a common temporary identifier for the user equipment with the primary network control node.

The method may further comprise
establishing a configuration response message including configuration response information, and
sending the configuration response message to the primary network control node.

Further modifications of the fifth aspect, in particular in respect to configuration preparation information and configuration response information, may be same or similar as according to the modifications of the fourth aspect.

The method according to the fifth aspect and its modifications may be carried out by the secondary control node or a part thereof, for example.

According to a sixth aspect of general embodiments of the present invention, a method is provided comprising
receiving and/or sending at least a first component carrier from and/or to a primary network control node, and at least a second component carrier from and/or to a secondary network control node,
receiving configuration information from the primary network control node and/or the secondary control node, and
using a common temporary identifier or different temporary identifiers for the at least one first component carrier and the at least one second component carrier depending on the configuration information.

The method may further comprise
receiving configuration information for configuring the at least one first component carrier and the at least one second component carrier from the primary network control node or the secondary control node.

The method according to the sixth aspect and its modification may be carried out by a user equipment or a part thereof, for example.

According to a seventh aspect of several embodiments of the present invention, a computer program product is provided which comprises code means for performing a method according to any one of the fourth to sixths aspects and their modifications when run on a processing means or module.

The computer program product is embodied on a computer-readable medium, and/or the computer program product may comprise a computer-readable medium on which the software code portions are stored, and/or the program is directly loadable into a memory of the processor.

According to an eighth aspect of several embodiments of the invention, an apparatus is provided which comprises
means for sending and/or receiving data to and/or from a secondary network control node,
means for establishing a configuration preparation message for the secondary network control node for preparing a carrier aggregation in which data to a user equipment is transmitted by at least two component carriers, and in which at least one first component carrier is provided between the apparatus and the user equipment and at least one second component carrier is provided between the secondary network control node and the user equipment,
wherein the configuration preparation message comprises configuration preparation information for the carrier aggregation, and
the apparatus further comprises means for sending the configuration preparation message to the secondary network control node.

The eighth aspect may be modified as follows:

The apparatus may comprise means for sending the configuration preparation message via an interface defined between network control nodes.

The apparatus may comprise means for defining a common temporary identifier for the user equipment to be used by the at least first component carrier and by the at least one second component carrier, or means for negotiating a common temporary identifier for the user equipment with the secondary network control node.

The apparatus may further comprise means for receiving a configuration response message including configuration response information from the secondary network control node, and means for using the configuration response information for utilizing the at least one second component carrier and configuring it to the user equipment.

Further modifications of the eighth aspect may be similar as the modifications according to the first aspect.

According to a ninth aspect of several embodiments of the invention, an apparatus is provided which comprises means for sending and/or receiving data to and/or from a primary network control node, means for receiving a configuration preparation message including configuration preparation information for preparing a carrier aggregation in which data to a user equipment is transmitted by at least two component carriers, and in which at least one first component carrier is provided between the primary network control node and the user equipment and at least one second component carrier is provided between the apparatus and the user equipment, and means for configuring the at least one second component carrier based on the received configuration preparation information.

The ninth aspect may be modified as follows:

The apparatus may comprise means for receiving the configuration preparation message via an interface defined between network control nodes.

The apparatus may comprise means for defining a common temporary identifier for the user equipment to be used by the at least first component carrier and by the at least one second component carrier, or means for negotiating a common temporary identifier for the user equipment with the primary network control node.

The apparatus may further comprise means for establishing a configuration response message including configuration response information, and means for sending the configuration response message to the primary network control node.

Further modifications of the ninth aspect may be similar as the modifications according to the second aspect.

According to a tenth aspect of several embodiments of the invention, an apparatus is provided which comprises means for receiving and/or sending at least a first component carrier from and/or to a primary network control node, and at least a second component carrier from and/or to a secondary network control node, means for receiving configuration information from the primary network control node and/or the secondary control node, and means for using a common temporary identifier or different temporary identifiers for the at least one first component carrier and the at least one second component carrier depending on the configuration information.

Optionally, the apparatus may comprise means for receiving configuration information for configuring the at least one first component carrier and the at least one second component carrier from the primary network control node or the secondary control node.

The apparatus may be a user equipment or a part thereof, for example.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
an interface connection configured to send and/or receive data to and/or from a secondary network control node; and
a processor configured to establish a configuration preparation message for the secondary network control node for preparing a carrier aggregation in which data to a user equipment is transmitted by at least two component carriers, and in which at least one first component carrier is provided between the apparatus and the user equipment and at least one second component carrier is provided between the secondary network control node and the user equipment, wherein the configuration preparation message comprises configuration preparation information for the carrier aggregation, the configuration preparation information comprising quality of service (QoS) information, wherein the QoS information comprises a certain percentage of the Aggregate Maximum Bit Rate (AMBR) part of a subscription of the user equipment, and the interface connection is configured to send the configuration preparation message to the secondary network control node, and wherein the configuration preparation information comprises configuration parameters for the component carriers.

2. The apparatus according to claim 1, wherein the configuration parameters comprise common parameters for the component carriers, wherein the common parameters optionally comprise radio link control configuration parameters and/or medium access control configuration control parameters.

3. The apparatus according to claim 1, wherein the configuration preparation information comprises tunnel information for configuring a tunnel between the apparatus and the secondary network control node, and/or the configuration preparation information comprises quality of service information.

4. The apparatus according to claim 1, wherein the configuration preparation information comprises a temporary identifier for the user equipment to be used by the at least one second component carrier, and wherein the processor is configured to define a common temporary identifier for the user equipment to be used by the at least first component carrier and by the at least one second component carrier, or to negotiate a common temporary identifier for the user equipment with the secondary network control node.

5. The apparatus according to claim 1, wherein
the interface connection is configured to receive a configuration response message including configuration response information from the secondary network control node, and
the processor is configured to use the configuration response information for utilizing the at least one second component carrier and configuring the at least one second component carrier to the user equipment.

6. The apparatus according to claim 5, wherein the configuration response information includes cell specific information, and/or a temporary identifier for the user equipment to be used by the at least one second component carrier, and/or tunnel information for configuring a tunnel between the apparatus and the secondary network control node.

7. An apparatus comprising:
an interface connection configured to send and/or receive data to and/or from a primary network control node; and
a processor,
wherein the interface connection is configured to receive a configuration preparation message including configuration preparation information for preparing a carrier aggregation in which data to a user equipment is transmitted by at least two component carriers, and in which at least one first component carrier is provided between the primary network control node and the user equipment and at least one second component carrier is provided between the apparatus and the user equipment, and wherein the configuration preparation information comprises configuration parameters for the component carriers, the configuration preparation information comprising quality of service (QoS) information, wherein the QoS information comprises a certain percentage of the Aggregate Maximum Bit Rate (AMBR) part of a subscription of the user equipment; and
the processor is configured to configure the at least one second component carrier based on the received configuration preparation information.

8. The apparatus according to claim 7, wherein the configuration parameters comprise common parameters for the component carriers, wherein the common parameters optionally comprise radio link control configuration parameters and/or medium access control configuration control parameters.

9. The apparatus according to claim 7, wherein the configuration preparation information comprises tunnel information for configuring a tunnel between the apparatus and the primary network control node and/or the configuration preparation information comprises quality of service information.

10. The apparatus according to claim 7, wherein the configuration preparation information comprises a temporary identifier for the user equipment to be used by the at least one second component carrier, and wherein the processor is configured to define a common temporary identifier for the user equipment to be used by the at least first component carrier and by the at least one second component carrier, or to negotiate a common temporary identifier for the user equipment with the primary network control node.

11. The apparatus according to claim 7, wherein
the processor is configured to establish a configuration response message including configuration response information, and
the interface connection is configured to send the configuration response message to the primary network control node.

12. The apparatus according to claim 11, wherein the configuration response information includes cell specific information, and/or a temporary identifier for the user equipment to be used by the at least one second component carrier, and/or tunnel information for configuring a tunnel between the apparatus and the primary network control node.

13. A method comprising:
establishing a configuration preparation message for a secondary network control node for preparing a carrier aggregation in which data to a user equipment is transmitted by at least two component carriers, and in which at least one first component carrier is provided between a primary network control node and the user equipment and at least one second component carrier is provided between the secondary network control node and the user equipment, wherein the configuration preparation message comprises configuration preparation information for the carrier aggregation and wherein the configuration preparation information comprise configuration parameters for the component carriers, the configuration preparation information comprising quality of service (QoS) information, wherein the QoS information comprises a certain percentage of the Aggregate Maximum Bit Rate (AMBR) part of a subscription of the user equipment; and
sending the configuration preparation message to the secondary network control node.

14. A computer program product comprising a non-transitory computer-readable storage medium bearing computer program code embodied therein for use with a computer, the computer program code comprising code for performing the method according to claim 13.

15. A method comprising receiving a configuration preparation message including configuration preparation information for preparing a carrier aggregation in which data to a user equipment is transmitted by at least two component carriers, and in which at least one first component carrier is provided between a primary network control node and the user equipment and at least one second component carrier is provided between a primary network control node and the user equipment, wherein the configuration preparation information comprises configuration parameters for the component carriers, the configuration preparation information comprising quality of service (QoS) information, wherein the QoS information comprises a certain percentage of the Aggregate Maximum Bit Rate (AMBR) part of a subscription of the user equipment; and configuring the at least one second component carrier based on the received configuration preparation information.

16. A computer program product comprising a non-transitory computer-readable storage medium bearing computer program code embodied therein for use with a computer, the computer program code comprising code for performing the method according to claim 15.

* * * * *